United States Patent
Seng et al.

(10) Patent No.: US 9,058,296 B2
(45) Date of Patent: Jun. 16, 2015

(54) DATA PROCESSING METHOD, MEMORY STORAGE DEVICE AND MEMORY CONTROL CIRCUIT UNIT

(71) Applicant: PHISON ELECTRONICS CORP., Miaoli (TW)

(72) Inventors: Kian-Fui Seng, Hsinchu (TW); Ming-Hui Tseng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 61 days.

(21) Appl. No.: 14/092,955

(22) Filed: Nov. 28, 2013

(65) Prior Publication Data

US 2015/0095663 A1 Apr. 2, 2015

(30) Foreign Application Priority Data

Oct. 2, 2013 (TW) .............................. 102135756 A

(51) Int. Cl.
   *G06F 13/00* (2006.01)
   *G06F 12/14* (2006.01)
   *G06F 3/06* (2006.01)

(52) U.S. Cl.
   CPC .......... *G06F 12/1408* (2013.01); *G06F 3/0622* (2013.01); *G06F 3/0659* (2013.01); *G06F 3/0679* (2013.01)

(58) Field of Classification Search
   CPC .................................................... G06F 12/1408
   USPC ........................................... 713/193; 711/103
   See application file for complete search history.

(56) References Cited

U.S. PATENT DOCUMENTS

| 2013/0139030 A1* | 5/2013 | Okubo et al. ................. 714/755 |
| 2013/0297894 A1* | 11/2013 | Cohen et al. ................. 711/154 |
| 2014/0075098 A1* | 3/2014 | Uno ............................. 711/103 |

* cited by examiner

*Primary Examiner* — Tae Kim
*Assistant Examiner* — Louis Teng
(74) *Attorney, Agent, or Firm* — Jianq Chyun IP Office

(57) ABSTRACT

A data processing method, a memory storage device, and a memory control circuit unit are provided. Here, each physical address corresponds to one flag. The data processing method includes: receiving a reading command; reading first data stored in the physical addresses of a physical programming unit; determining whether a first flag in the physical programming unit is in a first status or a second status; transmitting decrypted first data or decrypted specific-format data to a host system according to whether the first flag is in the first status or the second status. Accordingly, the encryption operation may be simplified.

24 Claims, 8 Drawing Sheets

DATA PROCESSING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 102135756, filed on Oct. 2, 2013. The entirety of the above-mentioned patent application is hereby incorporated by reference herein and made a part of this specification.

BACKGROUND

1. Technology Field

The invention relates to a data processing method. More particularly, the invention relates to a data processing method for a rewritable non-volatile memory module, a memory storage device using the data processing method, and a memory control circuit unit using the data processing method.

2. Description of Related Art

The markets of digital cameras, mobile phones, and MP3 players have expanded rapidly in recent years, resulting in escalating demands of consumers for storage media. Since a rewritable non-volatile memory module (e.g., a flash memory) is characterized by data non-volatility, low power consumption, small volume, non-mechanical structure, and so on, the rewritable non-volatile memory module is rather adapted to be built in a variety of portable multimedia devices.

In most cases, the rewritable non-volatile memory module is employed together with a host system. The host system is able to access data in the rewritable non-volatile memory module, i.e., the host system is able to read data from or write data into the rewritable non-volatile memory module. Under certain circumstances, the data written into the rewritable non-volatile memory module are encrypted first, and the data read from the rewritable non-volatile memory, module are decrypted first and then transmitted to the host system. Said encryption and decryption operations may be performed by means of a circuit which encrypts the data from the host system and decrypts the data to be transmitted to the host system. However, the rewritable non-volatile memory module has the smallest unit (e.g., a physical page) for writing data. If the amount of data to be written by the host system is smaller than the capacity of one physical page, said physical page will be filled with specific data. In consideration of consistency in encryption and decryption algorithms, the specific data need be encrypted. Since additional circuits are required for encrypting these specific data, the manufacturing costs may increase due to the additional circuits.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

The invention is directed to a data processing method, a memory storage device, and a memory control circuit unit capable of simplifying an encryption operation.

In an exemplary embodiment of the invention, a data processing method for a rewritable non-volatile memory module is provided. The rewritable non-volatile memory module includes a plurality of physical programming units, each of the physical programming units includes a plurality of physical addresses, and each of the physical addresses corresponds to one of a plurality of flags. The data processing method includes: configuring a plurality of logical addresses and mapping the logical addresses to parts of the physical programming units; receiving from a host system a reading command of reading a first logical address of the logical addresses, wherein the first logical address is mapped to a first physical programming unit of the physical programming units; performing a first reading process. The first reading process includes: reading first data stored in the physical addresses of the first physical programming unit; determining whether a first flag of the flags corresponding to the physical addresses of the first physical programming unit is in a first status or in a second status; if the first flag is in the first status, performing a decryption operation on a part of the first data stored in the physical address corresponding to the first flag according to a first key to obtain first decrypted data, and transmitting the first decrypted data to the host system; if the first flag is in the second status, performing the decryption operation on specific-format data according to the first key to obtain second decrypted data, and transmitting the second decrypted data to the host system.

In an exemplary embodiment of the invention, a memory storage device that includes a connection interface unit, the aforesaid rewritable non-volatile memory module, and a memory control circuit unit is provided. The connection interface unit is configured to couple to a host system. The memory control circuit unit is coupled to the connection interface unit and the rewritable non-volatile memory module and configured to configure a plurality of logical addresses and map the logical addresses to parts of the physical programming units. The memory control circuit unit is also configured to receive from a host system a reading command of reading a first logical address of the logical addresses, and the first logical address is mapped to a first physical programming unit of the physical programming units. The memory control circuit unit is also configured to perform a first reading process. The first reading process includes: reading first data stored in the physical addresses of the first physical programming unit; determining whether a first flag of the flags corresponding to the physical addresses of the first physical programming unit is in a first status or in a second status; if the first flag is in the first status, performing a decryption operation on a part of the first data stored in the physical address corresponding to the first flag according to a first key to obtain first decrypted data, and transmitting the first decrypted data to the host system; if the first flag is in the second status, performing the decryption operation on specific-format data according to the first key to obtain second decrypted data, and transmitting the second decrypted data to the host system.

In an exemplary embodiment of the invention, a memory control circuit unit configured to control the aforesaid rewritable non-volatile memory module is provided. The memory control circuit unit includes an encryption and decryption circuit, a host interface, a memory interface, and a memory management circuit. The host interface is configured to couple to a host system. The memory interface is configured to couple to the rewritable non-volatile memory module. The memory management circuit is coupled to the host interface and the memory interface and configured to configure a plurality of logical addresses and map the logical addresses to parts of the physical programming units. The memory management circuit is also configured to receive from the host system a reading command of reading a first logical address of the logical addresses, and the first logical address is mapped to a first physical programming unit of the physical programming units. The memory management circuit is configured to read first data stored in the physical addresses of the first physical programming unit and determine whether a first flag of the flags corresponding to the physical addresses of the first physical programming unit is in a first status or in a second status. If the first flag is in the first status, the encryption and decryption circuit is configured to perform a decryption operation on a part of the first data stored in the physical address corresponding to the first flag according to a first key to obtain first decrypted data, and the memory management circuit is configured to transmit the first decrypted data to the host system. If the first flag is in the second status, the encryption and decryption circuit is configured to perform the decryption operation on specific-format data according to the first key to obtain second decrypted data, and the memory management circuit is configured to transmit the second decrypted data to the host system.

In view of the foregoing, according to the data processing method, the memory storage device, and the memory control circuit unit described in the exemplary embodiments of the invention, the encrypted specific-format data may be replaced by the flags, and therefore no additional circuit is required for encrypting the specific-format data.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
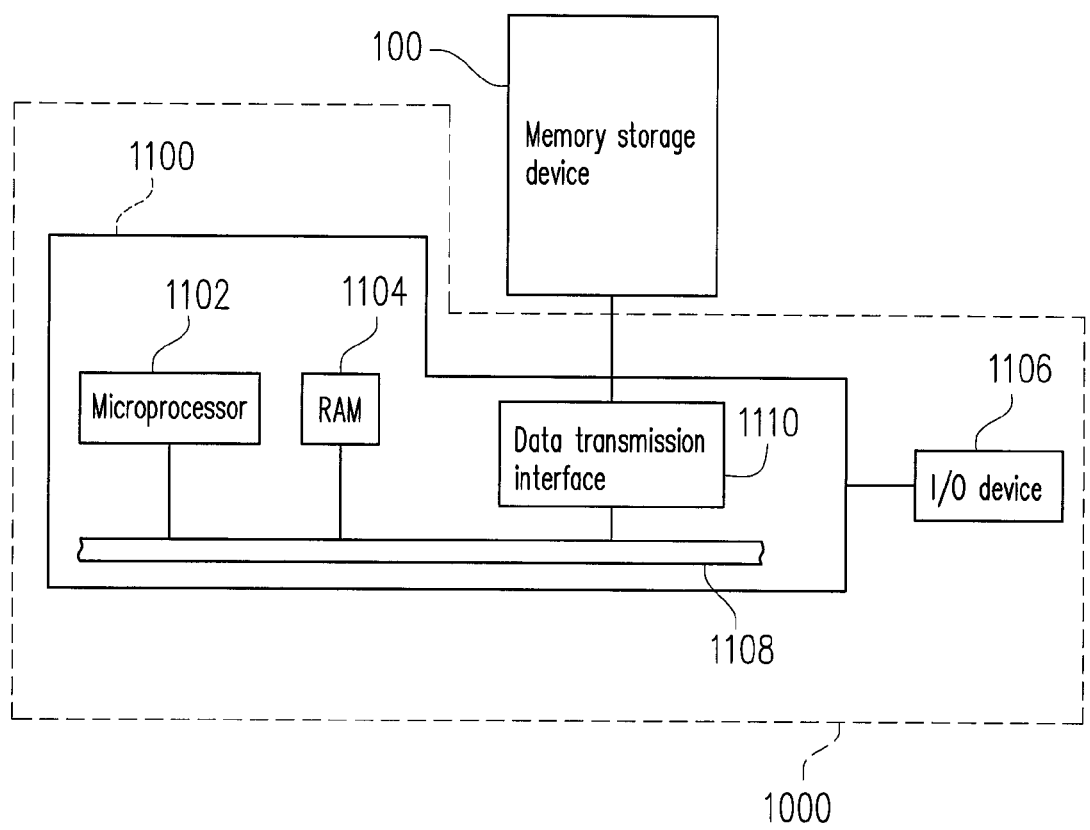
FIG. 1A illustrates a host system and a memory storage device according to an exemplary embodiment of the invention.

Reference will now be made in detail to the present exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage device (also referred to as a memory storage system) typically includes a rewritable non-volatile memory module and a controller (also referred to as a control circuit). The memory storage device is usually used together with a host system, such that the host system is able to write data into or read data from the memory storage device.

FIG. 1A illustrates a host system and a memory storage device according to an exemplary embodiment of the invention.

Figure 1B:
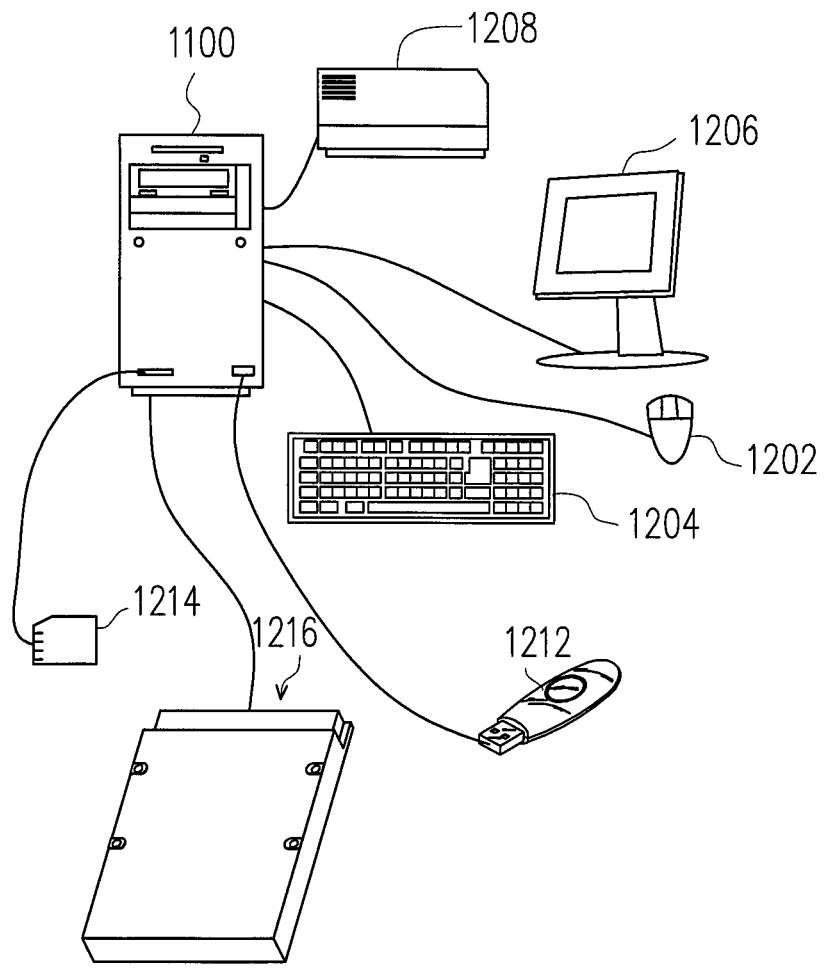
FIG. 1B schematically illustrates a computer, an input/output (I/O) device, and a memory storage device according to an exemplary embodiment of the invention.

With reference to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to that illustrated in FIG. 1B and may further include other devices.

In the exemplary embodiment of the invention, the memory storage device 100 is coupled to other devices of the host system 1000 through the data transmission interface 1110. Through operating the microprocessor 1102, the RAM 1104, and the I/O device 1106, the data can be written into or read from the memory storage device 100. For instance, the memory storage device 100 may be a rewritable non-volatile memory storage device, such as a portable drive 1212, a memory card 1214, or a solid state drive (SSD) 1216 as illustrated in FIG. 1B.

Figure 1C:
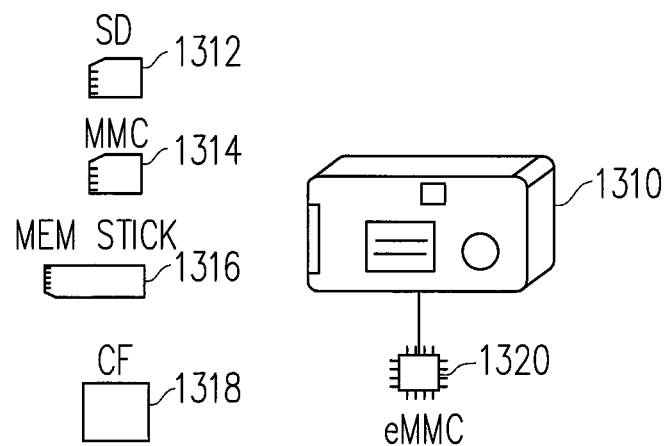
FIG. 1C schematically illustrates a host system and a memory storage device according to an exemplary embodiment of the invention.

Generally, the host system 1000 may be any system that can be substantively operated together with the memory storage device 100 to store data. In the exemplary embodiment, although the host system 1000 is described as a computer system, the host system 1000 described in another exemplary embodiment of the invention may be a digital camera, a video camera, a communication device, an audio player, a video player, and so forth. For instance, if the host system is a digital camera (a camcorder) 1310, the rewritable non-volatile memory storage device is a secure digital (SD) card 1312, a multi media card (MMC) 1314, a memory stick (MS) 1316, a compact flash (CF) card 1318, or an embedded storage device 1320 (as shown in FIG. 1C) used by the digital camera (the camcorder) 1310. The embedded storage device 1320 includes an embedded MMC (eMMC). It should be mentioned that the eMMC is directly coupled to the motherboard of the host system.

Figure 2:
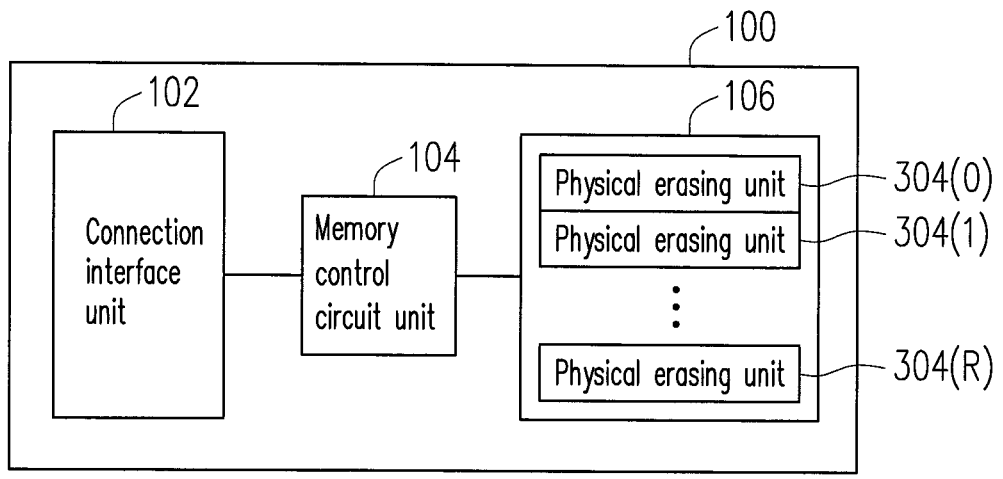
FIG. 2 is a simple block diagram illustrating the memory storage device depicted in FIG. 1A.

FIG. 2 is a simple block diagram illustrating the memory storage device depicted in FIG. 1A.

With reference to FIG. 2, the memory storage device 100 includes a connection interface unit 102, a memory control circuit unit 104, and a rewritable non-volatile memory module 106.

In the present exemplary embodiment, the connection interface unit 102 complies with the serial advanced technology attachment (SATA) standard. However, it should be understood that the invention is not limited thereto, and the connection interface unit 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory sick (MS) interface standard, the multi media card (MMC) interface standard, the eMMC interface standard, the universal flash storage (UFS) interface standard, the compact flash (CF) standard, the integrated device electronics (IDE) standard, or other suitable standards. The connection interface unit 102 and the memory control circuit unit 104 may be packaged into one chip, or the connection interface unit 102 may be arranged outside a chip having the memory control circuit unit 104.

The memory control circuit unit 104 is configured to execute a plurality of logic gates or control commands implemented in a hardware form or a firmware form and perform various data operations (e.g., data writing, reading, and erasing) in the rewritable non-volatile memory module 106 according to commands issued by the host system 1000.

The rewritable non-volatile memory module 106 is coupled to the memory control circuit unit 104 and configured for storing data written by the host system 1000. The rewritable non-volatile memory module 106 has a plurality of physical erasing units 304(0) to 304(R). For instance, the physical erasing units 304(0) to 304(R) may belong to the same memory die or belong to different memory dies. Each physical erasing unit has a plurality of physical programming units, and the physical programming units of the same physical erasing unit may be written independently and erased simultaneously. For instance, each physical erasing unit is composed of 128 physical programming units. However, the invention is not limited thereto, and each of the physical erasing units may also be comprised of 64, 256, or any other number of physical programming units.

To be specific, each physical erasing unit includes a plurality of word lines and a plurality of bit lines, and each memory cell is configured at an intersection of one of the word lines and one of the bit lines. Each memory cell stores one or multiple bits, and in the same physical erasing unit, data in all of the memory cells are erased together. According to the present exemplary embodiment, the physical erasing unit is the smallest unit for erasing data; namely, each of the physical erasing units contains the least number of memory cells that are erased all together. The physical erasing units are physical blocks, for instance. Besides, the memory cells on the same word line constitute one or plural physical programming units. If each memory cell is able to store two or more bits, the physical programming units on the same word line may be categorized into lower and upper physical programming units. In general, the writing speed of the lower physical programming units is greater than that of the upper physical programming units. According to the present exemplary embodiment, each physical programming unit usually includes a data bit area and a redundant bit area. The data bit area includes a plurality of physical addresses for storing data of users, and the redundant bit area is configured for storing system data (e.g., error correction codes). The physical programming units are physical pages, and the physical addresses may be referred to as physical sectors, for instance. In the present exemplary embodiment, each data bit area contains 8 physical addresses, and the size of each physical address is 512 bytes (512B). However, in other exemplary embodiments, 16, 32, or more or less number of the physical addresses may be contained in the data bit area, and the number and the size of the physical addresses are not limited in the invention.

In the present exemplary embodiment, the rewritable non-volatile memory module 106 is a multi-level cell (MLC) NAND flash memory module (i.e., a flash memory module capable of storing data of at least 2 bits in one memory cell). However, the invention is not limited thereto, and the rewritable non-volatile memory module 106 may also be a single-level cell (SLC) NAND flash memory module, a trinary-level cell (TLC) NAND flash memory module, any other flash memory module, or any other memory module with the same characteristics.

Figure 3:
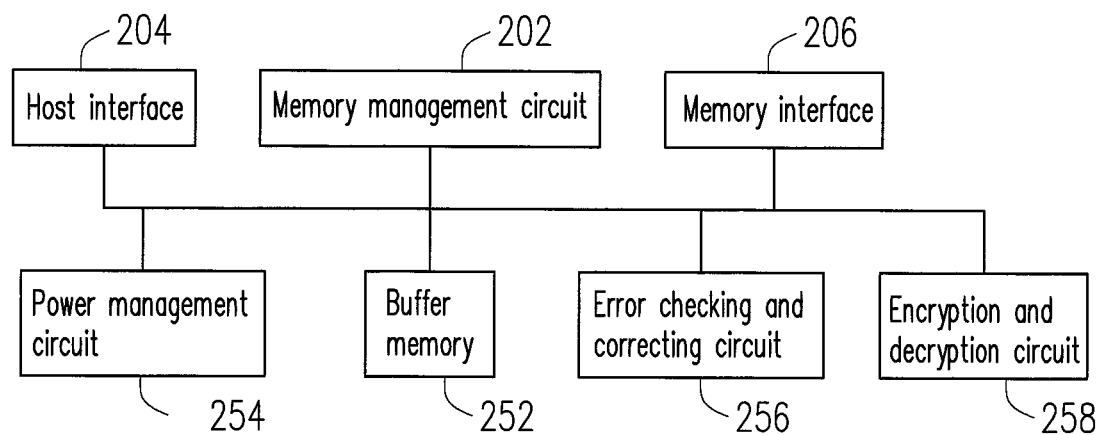
FIG. 3 is a simple block diagram illustrating a memory control circuit unit according to an exemplary embodiment of the invention.

FIG. 3 is a simple block diagram illustrating a memory control circuit unit according to an exemplary embodiment of the invention.

With reference to FIG. 3, the memory control circuit unit 104 includes a memory management circuit 202, a host interface 204, and a memory interface 206.

The memory management circuit 202 is configured to control the overall operation of the memory control circuit unit 104. Particularly, the memory management circuit 202 has a plurality of control commands; when the memory storage device 100 is in operation, the control commands are executed to perform data writing, reading, and erasing operations. The operations of the memory management circuit 202 are described below; in case that the operations of the memory management circuit 202 are similar to those of the memory control circuit unit 104, the relevant descriptions will be omitted.

In the present exemplary embodiment, the control commands of the memory management circuit 202 are implemented in a firmware form. For example, the memory management circuit 202 has a microprocessor unit (not shown) and a read-only memory (ROM, not shown), and the control commands are burnt into the ROM. When the memory storage device 100 is in operation, the control commands are executed by the microprocessor unit to write, read, and erase data.

In another exemplary embodiment of the invention, the control commands of the memory management circuit 202 may also be stored in a specific area of the rewritable non-volatile memory module 106 (e.g., a system area of a memory module exclusively used for storing system data) in form of program codes. Additionally, the memory management circuit 202 has a microprocessor unit (not shown), a ROM (not shown), and a RAM (not shown). In particular, the ROM has boot codes, and when the memory control circuit unit 104 is enabled, the microprocessor unit first executes the boot codes to load the control commands from the rewritable non-volatile memory module 106 into the RAM of the memory management circuit 202. The microprocessor unit then runs the control commands to write, read, and erase data.

Moreover, the control commands of the memory management circuit 202 may also be implemented in a hardware form according to another exemplary embodiment of the invention. For instance, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage physical erasing units of the rewritable non-volatile memory module 106; the memory writing unit is configured to issue a writing command to the rewritable non-volatile memory module 106 for writing data thereto; the memory reading unit is configured to issue a reading command to the rewritable non-volatile memory module 106 for reading data therefrom; the memory erasing unit is configured to issue an erasing command to the rewritable non-volatile memory module 106 for erasing data therefrom; the data processing unit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the SATA standard. However, it should be understood that the invention is not limited thereto, and the host interface 204 may comply with the PATA standard, the IEEE 1394 standard, the PCI express standard, the USB standard, the SD standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

In an exemplary embodiment of the invention, the memory control circuit unit 104 further includes a buffer memory 252, a power management circuit 254, an error checking and correcting circuit 256, and an encryption and decryption circuit 258.

The buffer memory 252 is coupled to the memory management circuit 202 and configured to temporarily store data and commands received from the host system 1000 or data received from the rewritable non-volatile memory module 106.

The power management circuit 254 is coupled to the memory management circuit 202 and configured to control the power supply of the memory storage device 100.

The error checking and correcting circuit 256 is coupled to the memory management circuit 202 and configured to perform an error checking and correcting procedure to ensure data accuracy. To be specific, when the memory management circuit 202 receives a writing command from the host system 1000, the error checking and correcting circuit 256 generates an ECC code for data corresponding to the writing command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 302 reads the ECC code corresponding to the read data, and the error checking and correcting circuit 256 executes the error checking and correcting procedure for the read data based on the ECC code.

The encryption and decryption circuit 258 is configured to encrypt and decrypt data. The operations of encrypting and decrypting data may comply with an advanced encryption standard (AES), a data encryption standard (DES), other symmetry-key algorithms, or asymmetry-key algorithms, which should not be construed as limitations to the invention. In the present exemplary embodiment, the encryption and decryption circuit 258 encrypts and decrypts data in a real-time manner (also referred to as on-the-fly manner).

Figure 4:
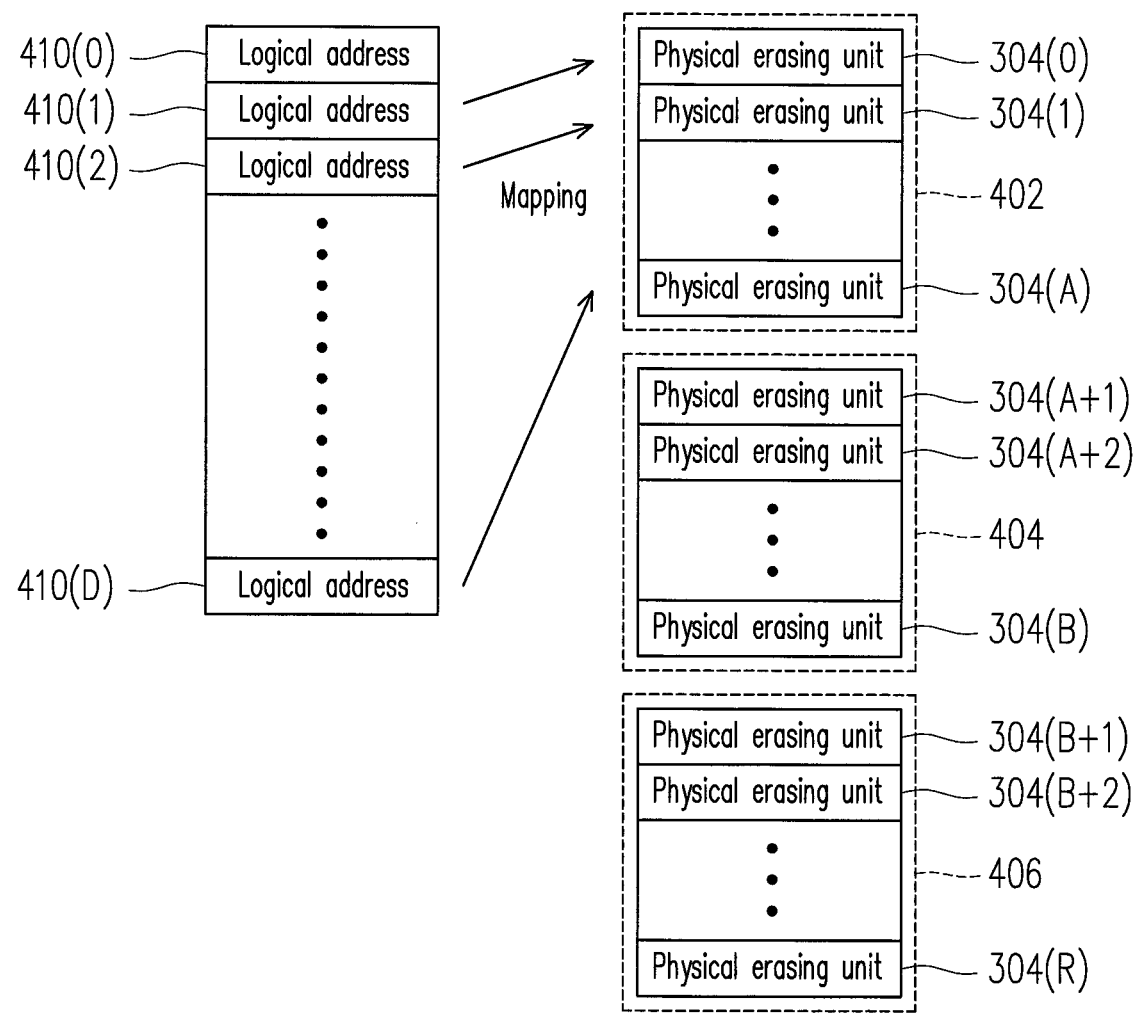
FIG. 4 schematically illustrates an example of managing a rewritable non-volatile memory module according to an exemplary embodiment of the invention.

FIG. 4 schematically illustrates an example of managing a rewritable non-volatile memory module according to an exemplary embodiment of the invention.

It should be understood that the terms used herein for describing the operations (such as "select," "divide," and "associate") performed on the physical erasing units of the rewritable non-volatile memory module 106 refer to logical operations performed on these physical erasing units. Namely, the physical erasing units in the rewritable non-volatile memory module are only logically operated, and the actual positions of the physical erasing units in the rewritable non-volatile memory module are not changed.

With reference to FIG. 4, the memory management circuit 202 logically divides the physical erasing units 304(0) to 304(R) into several areas, such as a data area 402, a spare area 404, and a system area 406.

The physical erasing units logically belonging to the data area 402 are configured for storing data from the host system 1000. The physical erasing units belonging to the spare area 404 serve as temporary storage areas of the data area 402. For instance, if the host system 1000 intends to update data in the data area 402, the data is written into the spare area 404 first and then moved to the data area 402 or combined with the data in the data area 402. Alternatively, the physical erasing units belonging to the spare area 404 may replace the physical erasing units belonging to the data area 402 and the system area 406. That is, when any physical erasing unit belonging to the data area 402 and the system area 406 is damaged (i.e., becomes a bad physical erasing unit), the physical erasing unit reserved in the spare area 404 may be applied to replace the bad physical erasing unit. If there is no normal physical erasing unit in the spare area 404, and damages to a physical erasing unit take place, the memory control circuit unit 104 announces that the entire memory storage device 100 is in a write-protect mode, and thus no more data can be written into the memory storage device 100. However, the invention is not limited thereto, and in another exemplary embodiment, the memory management circuit 202 may also divide the physical erasing units into one more area (i.e., a replacement area) for storing physical erasing units that may replace the bad physical erasing units.

The physical erasing units belonging to the system area 406 are used for recording system data; here, the system data include information related to a manufacturer and a model of a memory chip, the number of the physical erasing units in the memory chip, the number of physical programming units in each physical erasing unit, and so forth.

The number of physical erasing units respectively belonging to the data area 402, the spare area 404, and the system area 406 may vary according to different memory specifications. Additionally, it has to be understood that the grouping relations of the physical erasing units associated with the data area 402, the spare area 404, and the system area 406 may be dynamically changed during the operation of the memory storage device 100. For instance, when a physical erasing unit in the data area 402 is damaged and replaced by a physical erasing unit in the spare area 404, the physical erasing unit originally belonging to the spare area 404 is then associated with the data area 402.

The memory management circuit 202 configures logical addresses 410(0) to 410(D) and maps the logical addresses 410(0) to 410(D) to the physical units 304(0) to 304(A) of the data area 402. The host system 1000 accesses the data in the data area 402 through the logical addresses 410(0) to 410(D). In the present exemplary embodiment, one logical address is mapped to one physical address, plural logical addresses constitute one logical programming unit, and plural logical programming units constitute one logical erasing unit. One logical programming unit is mapped to one or plural physical programming units, and one logical erasing unit is mapped to one or plural physical erasing units.

According to the present exemplary embodiment, the memory management circuit 202 manages the rewritable non-volatile memory module 106 by means of the logical erasing units, and therefore the memory management circuit 202 establishes a mapping table to record the mapping relationship between the logical erasing units and the physical erasing units. In another exemplary embodiment, the memory management circuit 202 manages the rewritable non-volatile memory module 106 by means of the logical programming units, and therefore the memory management circuit 202 establishes a mapping table to record the mapping relationship between the logical programming units and the physical programming units.

When the host system 1000 intends to write data into the memory storage device 100, the host system 1000 issues a writing command to write data into a certain logical address. After receiving the writing command, the encryption and decryption circuit 258 encrypts the data, and the memory management circuit 202 selects one physical programming unit and writes the encrypted data into one or more physical addresses in the physical programming unit. However, the amount of the written data may not be compliant with the capacity of the physical programming unit. If the amount of the written data is smaller than the capacity of the physical programming unit, some physical addresses in the written physical programming unit may not be programmed. Generally, the non-programmed physical addresses store the encrypted specific-format data (e.g., the data that are all "0" or "1", which should not be construed as a limitation to the invention). As such, when the host system 1000 intends to read the data in the physical programming unit, the data in the physical programming unit are decrypted and then become the previously-written data and the specific-format data, and the data is received by the host system 1000.

However, in the present exemplary embodiment, the memory management unit 202 records plural flags, each of which corresponds to one physical address. The corresponding relationship between the flags and the physical addresses in the data area 402 is, for instance, a bijection relationship. These flags are configured to replace the encrypted specific-format data. In particular, these flags serve to indicate which physical addresses store the encrypted data and which physical addresses store the encrypted specific-format data. The memory management circuit 202 does not write the encrypted specific-format data into the physical programming units. According to the present exemplary embodiment, the flags are recorded in the redundant bit area and correspond to the physical addresses in the data bit area in the same physical programming unit. However, in another exemplary embodiment of the invention, these flags may also be recorded in other memories, which should not be construed as a limitation to the invention. Functions and relevant operations of these flags are described in the following exemplary embodiment.

Figure 5:
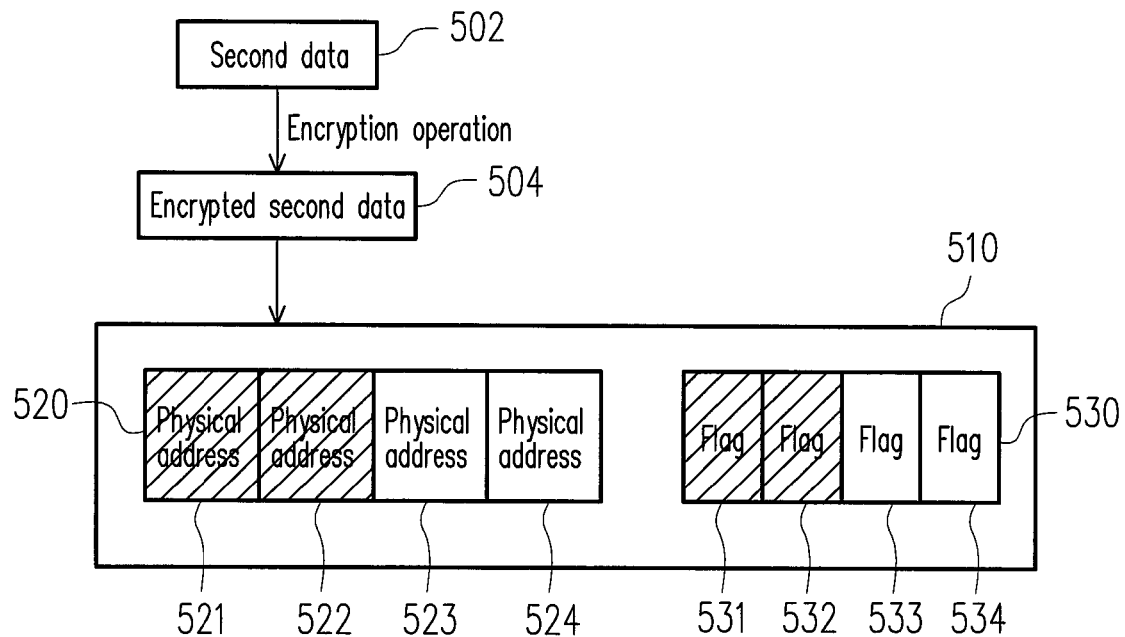
FIG. 5 is a schematic diagram illustrating an example of writing data according to an exemplary embodiment of the invention.

FIG. 5 is a schematic diagram illustrating an example of writing data according to an exemplary embodiment of the invention.

With reference to FIG. 5, it is assumed that second data 502 are written into at least one of the logical addresses 410(0) to 410(D) according to the writing command issued by the host system 1000. The encryption and decryption circuit 258 performs an encryption operation on the second data 502 to obtain encrypted second data 504. In the present exemplary embodiment, the amount of the second data 502 is the same as the amount of the encrypted second data 504, whereas the invention is not limited thereto. The memory management circuit 202 selects a physical programming unit 510 (also referred to as a second physical programming unit) from the spare area 404. The physical programming unit 510 includes a data bit area 520 and a redundant bit area 530. The data bit areas 520 include physical addresses 521 to 524, and the redundant bit areas 530 record flags 531 to 534. Here, the physical address 521 corresponds to the flag 531; the physical address 522 corresponds to the flag 532; the physical address 523 corresponds to the flag 533; the physical address 524 corresponds to the flag 534.

The memory management circuit 202 writes the encrypted second data 504 into at least one first physical address in the data bit area 520, and the encrypted second data 504 are not written into at least one second physical address in the data bit area 520. The memory management circuit 202 sets the flag (also referred to as a second flag) of the flags 531 to 534 corresponding to the first physical address to be in the first status and sets the flag (also referred to as a third flag) of the flags 531 to 534 corresponding to the second physical address to be in the second status. The first status indicates that the corresponding physical address stores the encrypted data, and the second status indicates that the corresponding physical address stores the encrypted specific-format data. For instance, the first status is represented as the bit "1," and the second status is represented as the bit "0." Nevertheless, the memory management circuit 202 may represent the first status and the second status by any bit, number, or symbol, and the invention is not limited thereto. Here, given that the amount of the second data 502 is 1024 KB (equal to the size of two physical addresses), the memory management circuit 202 writes the encrypted second data 504 into the physical addresses 521 and 522 (i.e., the first physical addresses), and the flags 531 and 532 are set to be in the first status. The memory management circuit 202 also sets the flags 533 and 534 corresponding to the physical addresses 523 and 524 (i.e., the second physical addresses) to be in the second status. Namely, in this exemplary embodiment, the size of the first physical addresses is equal to the amount of the second data 502, and other physical addresses except the first physical addresses among the physical addresses 521 to 524 are second physical addresses.

In another exemplary embodiment, the amount of the second data 502 and the amount of the encrypted second data 504 are greater than the capacity of one physical programming unit; therefore, the memory management circuit 202 writes parts of the second data 504 into another physical programming unit or other physical programming units, and the flags in the physical programming unit(s) are all set to be in the first status. The memory management circuit 202 also writes the rest of the second data 504 into the second physical programming unit 510; that is to say, the size of the first physical address(es) is equal to the amount of the rest of the second data 504. Note that the amount of the second data 502 should not be construed as a limitation to the invention.

Figure 6:
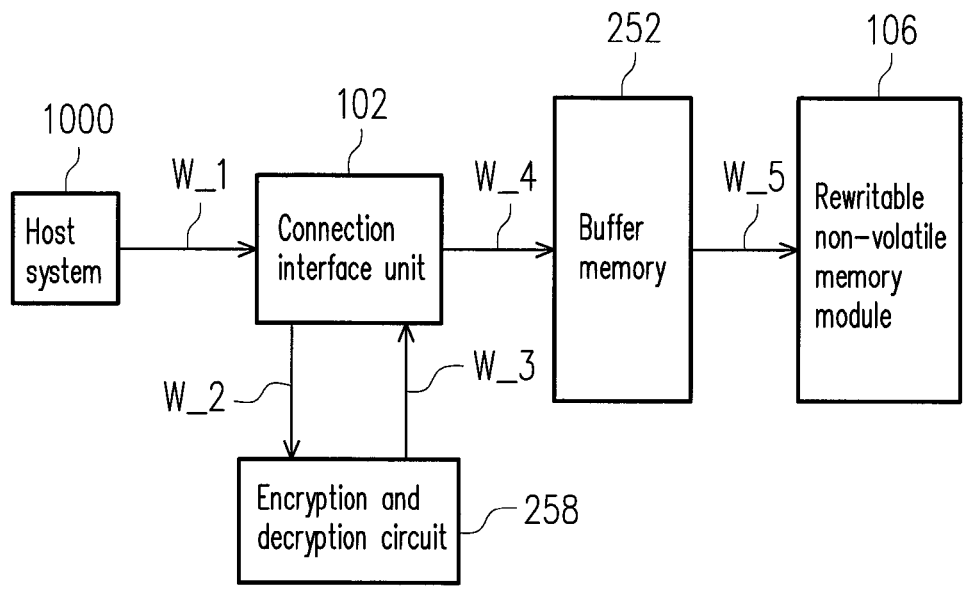
FIG. 6 is a schematic diagram illustrating an operation of executing a writing command by a memory control circuit unit according to an exemplary embodiment of the invention.

FIG. 6 is a schematic diagram illustrating an operation of executing a writing command by a memory control circuit unit according to an exemplary embodiment of the invention.

For the sake of simplification, some, but not all, of the components in the memory storage device 100 are illustrated in FIG. 6. In step W_1, the host system 1000 transmits a writing command to the connection interface unit 102. In step W_2, the connection interface unit 102 transmits the to-be-written data to the encryption and decryption circuit 258, and the encryption and decryption circuit 258 instantaneously performs an encryption operation on the to-be-written data. In step W_3, the encryption and decryption circuit 258 transmits the encrypted data to the connection interface unit 102. In step W_4, the memory management circuit 202 stores the encrypted data into the buffer memory 252. Besides, the memory management circuit 202 generates the corresponding flags and temporarily stores these flags into the buffer memory 252. In step W_5, the memory management circuit 202 writes the encrypted data and the corresponding flags into the rewritable non-volatile memory module 106. Thereby, the memory management circuit 202 need not perform the encryption operation on the specific-format data nor write the encrypted specific-format data into the rewritable non-volatile memory module 106.

In an exemplary embodiment of the invention, the host system 1000 issues a key updating command to the memory storage device 100. The encryption and decryption circuit 258 changes the first key applied to the encryption operation and the decryption operation into a second key according to the key updating command. However, when the host system 1000 intends to read the data, the change to the key poses an impact on how to read the data from the rewritable non-volatile memory module 106. In the present exemplary embodiment, the memory management circuit 202 determines whether the key is changed and determines whether the to-be-read data is encrypted by the first key or the second key, so as to perform different reading processes under different circumstances. How the memory management circuit 202 reads the data is described below with reference to the following exemplary embodiment.

With reference to FIG. 5, when the host system 1000 intends to read data, the host system 1000 issues a reading command to the memory storage device 100. The reading command is indicative of reading at least one first logical address of the logical addresses 410(0) to 410(D), and the first logical address is mapped to a first physical programming unit. The first physical programming unit may be the same as or different from the physical programming unit 510, which should not be construed as a limitation to the invention.

It is assumed that the host system 1000 writes the second data 502 and then issues the reading command (i.e., the host system 1000 does not issue the key updating command, and the second data 502 are encrypted by the first key), and that the to-be-read first logical address is mapped to the physical programming unit 510. In this situation, the memory management circuit 202 determines whether the first logical address is an address specified by a trim command According to the trim command, the host system 1000 is configured to delete data stored in one or more logical addresses, and the memory management circuit 202 records the deleted logical address(es). If the first logical address is an address specified by the trim command, it indicates that the host system 1000 has logically deleted the data stored in the physical programming unit 510, and therefore the memory management circuit 202 transmits the specific-format data to the host system 1000. If the first logical address is not the address specified by the trim command, or if the memory management circuit 202 does not receive the trim command, the memory management circuit 202 reads the data (also referred to as the first data) stored in the physical addresses 521 to 524 and determines whether each of the flags 531 to 534 is in the first status or in the second status. If one of the flags 531 to 534, i.e., the first flag, is in the first status, the encryption and decryption circuit 258 performs a decryption operation on a part of the first data stored in the physical address corresponding to the first flag according to the first key to obtain decrypted data (also referred to as the first decrypted data), and the memory management circuit 202 transmits the first decrypted data to the host system 1000. If the first flag is in the second status, the encryption and decryption circuit 258 performs the decryption operation on specific-format data according to the first key to obtain decrypted data (also referred to as the second decrypted data), and the memory management circuit 202 transmits the second decrypted data to the host system 1000. For instance, the flags 531 and 532 are in the first status, and thus the encryption and decryption circuit 258 performs the decryption operation on the part of the first data stored in physical addresses 521 and 522, and the memory management circuit 202 transmits the decrypted data to the host system 1000. By contrast, the flags 533 and 534 are in the second status, and thus the encryption and decryption circuit 258 performs the decryption operation on the specific-format data according to the first key, and the memory management circuit 202 transmits the decrypted data to the host system 1000. Namely, the host system 1000 receives the second data 502 and the specific-format data (equal to the size of two physical addresses). If no key updating command is received, or if the reading command is received before the key updating command is received, the resultant reading process is referred to as the first reading process.

It should be mentioned that the operation of transmitting the data to the host system 1000 by the memory management circuit 202 is performed by the memory management circuit 202 which drives the connection interface unit 102, which will not be further explained hereinafter.

Alternatively, the host system 1000 writes the second data 502, issues the key updating command, and then issues the reading command. That is, the second data 502 are encrypted by the first key, but the encryption and decryption circuit 258 uses the second key when the second data is to be read. It is also assumed that the to-be-read first logical address is mapped to the physical programming unit 510. In this situation, the memory management circuit 202 determines whether the first logical address is an address specified by the trim command. If the first logical address is an address specified by the trim command, the encryption and decryption circuit 258 performs the decryption operation on the specific-format data according to the second key to obtain the decrypted data, and the memory management circuit 202 transmits the decrypted data to the host system 1000. If, however, the first logical address is not the address specified by the trim command, or if the memory management circuit 202 does not receive the trim command, the memory management circuit 202 reads the data (also referred to as the first data) stored in the physical address 510 and determines whether each of the flags 531 to 534 is in the first status or in the second status. Since the flags 531 and 532 are in the first status, the encryption and decryption circuit 258 performs the decryption operation on the part of the first data stored in the physical addresses 521 and 522 according to the second key to obtain decrypted data, and the memory management circuit 202 transmits the decrypted data to the host system 1000. By contrast, since the flags 533 and 534 are in the second status, the encryption and decryption circuit 258 performs the decryption operation on the specific-format data according to the second key to obtain decrypted data, and the memory management circuit 202 transmits the decrypted data to the host system 1000.

It is also likely for the host system 1000 to issue the key updating command, writes the second data 502, and then issues the reading command. Namely, the second data 502 are encrypted by the second key. In this situation, the memory management circuit 202 determines whether the first logical address is an address specified by the trim command. If the first logical address is an address specified by the trim command, the connection interface unit 102 directly transmits the specific-format data to the host system 1000. If, however, the first logical address is not the address specified by the trim command, or if the memory management circuit 202 does not receive the trim command, the memory management circuit 202 reads the first data stored in the physical address 510 and determines whether each of the flags 531 to 534 is in the first status or in the second status. Since the flags 531 and 532 are in the first status, the encryption and decryption circuit 258 performs the decryption operation on the part of the first data stored in the physical addresses 521 and 522 according to the second key to obtain decrypted data, and the memory management circuit 202 transmits the decrypted data to the host system 1000. By contrast, since the flags 533 and 534 are in the second status, the encryption and decryption circuit 258 performs the decryption operation on the specific-format data according to the second key to obtain decrypted data, and the memory management circuit 202 transmits the decrypted data to the host system 1000.

In brief, after the key is changed, the memory management circuit 202 performs the decryption operation according to the second key. If the read first data is encrypted by the first key, and the corresponding address has been deleted according to the trim command, the encryption and decryption circuit 258 performs the decryption operation on the specific-format data according to the second key, i.e., some random numbers may be generated. However, if the read first data is encrypted by the second key, and the corresponding logical address has been deleted according to the trim command, the connection interface unit 102 directly transmits the specific-format data to the host system 1000. On other conditions, the encryption and decryption circuit 258 may perform the decryption operation on the first data or the specific-format data by means of the second key according to whether the flag is in the first or in the second status. If the reading command is received after the key updating command is received, the resultant reading process is referred to as the second reading process.

Figure 7:
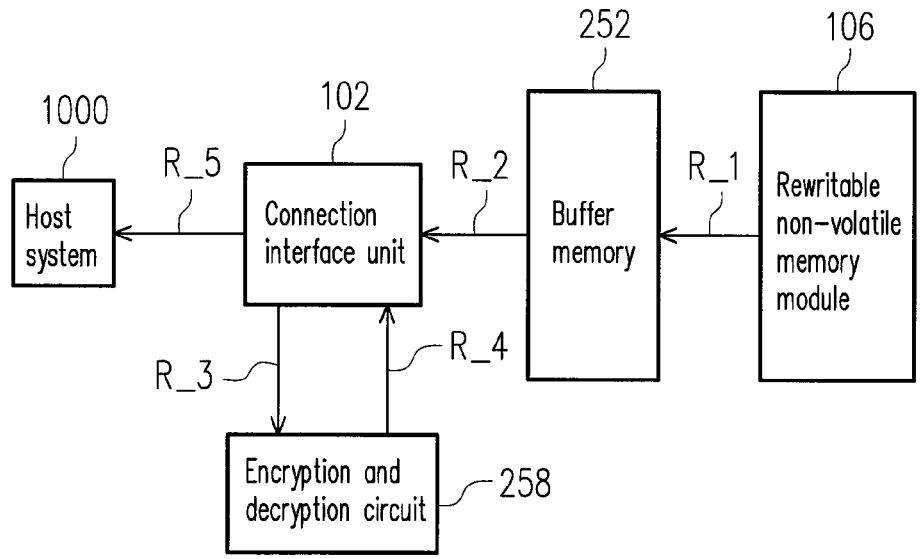
FIG. 7 is a schematic diagram illustrating an operation of executing a reading command by a memory control circuit unit according to an exemplary embodiment of the invention.

FIG. 7 is a schematic diagram illustrating an operation of executing a reading command by a memory control circuit unit according to an exemplary embodiment of the invention.

For the sake of simplification, some, but not all, of the components in the memory storage device 100 are illustrated in FIG. 7. In step R_1, the memory management circuit 202 reads the first data and the corresponding flag from the first physical programming unit in the rewritable non-volatile memory module 106 and transmits the first data and the corresponding flag to the buffer memory 252. In step R_2, the memory management circuit 202 determines to transmit the first data or the specific-format data to the connection interface unit 102 according to whether the read flag is in the first status or in the second status. In step R_3, the connection interface unit 102 transmits the first data or the specific-format data to the encryption and decryption circuit 258. The encryption and decryption circuit 258 performs the decryption operation on the first data or the specific-format data. In step R_4, the encryption and decryption circuit 258 transmits the decrypted result to the connection interface unit 102. In step R_5, the connection interface unit 102 transmits the decrypted result to the host system 1000.

Figure 8:
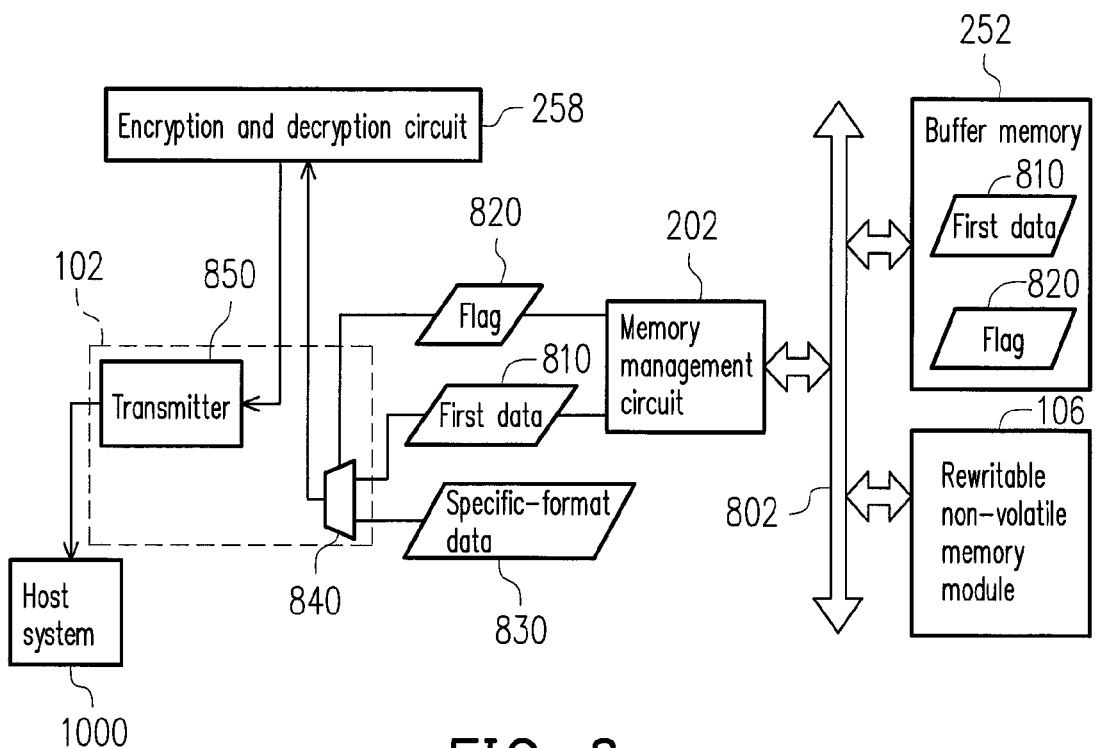
FIG. 8 is a block circuit diagram when a memory control circuit unit executes a reading command according to an exemplary embodiment of the invention.

FIG. 8 is a partial block circuit diagram when a memory control circuit unit executes a reading command according to an exemplary embodiment of the invention.

With reference to FIG. 8, according to a reading command, the memory management circuit 202 reads the first data 810 and the corresponding flag 820 from the rewritable non-volatile memory module 106 and writes the first data 810 and the flag 820 into the buffer memory 252 through a bus 802. The memory management circuit 202 then transmits the flag 820 to a control terminal of a multiplexer 840 and transmits the first data 810 to a first terminal of the multiplexer 840. The specific-format data 830 are transmitted to a second terminal of the multiplexer 840. Here, the specific-format data 830 may be generated by the memory management circuit 202 or another circuit, which should not be construed as a limitation to the invention. If the flag 820 is in the first status, the multiplexer 840 transmits the first data 810 to the encryption and decryption circuit 258; if the flag 820 is in the second status, the multiplexer 840 transmits the specific-format data 830 to the encryption and decryption circuit 258. The encryption and decryption circuit 258 performs the decryption operation on the received data and transmits the decrypted data to a transmitter 850. The transmitter 850 then transmits the decrypted data to the host system 1000.

Figure 9A:
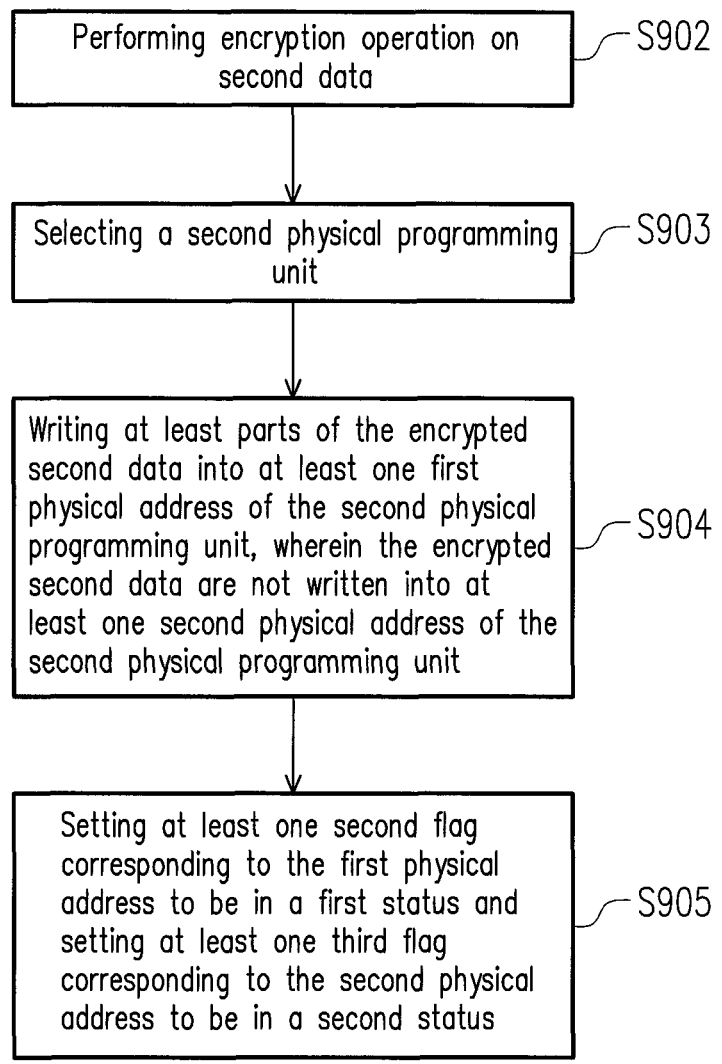
FIG. 9A and FIG. 9B are flowcharts of a data processing method according to an exemplary embodiment of the invention.
Figure 9B:
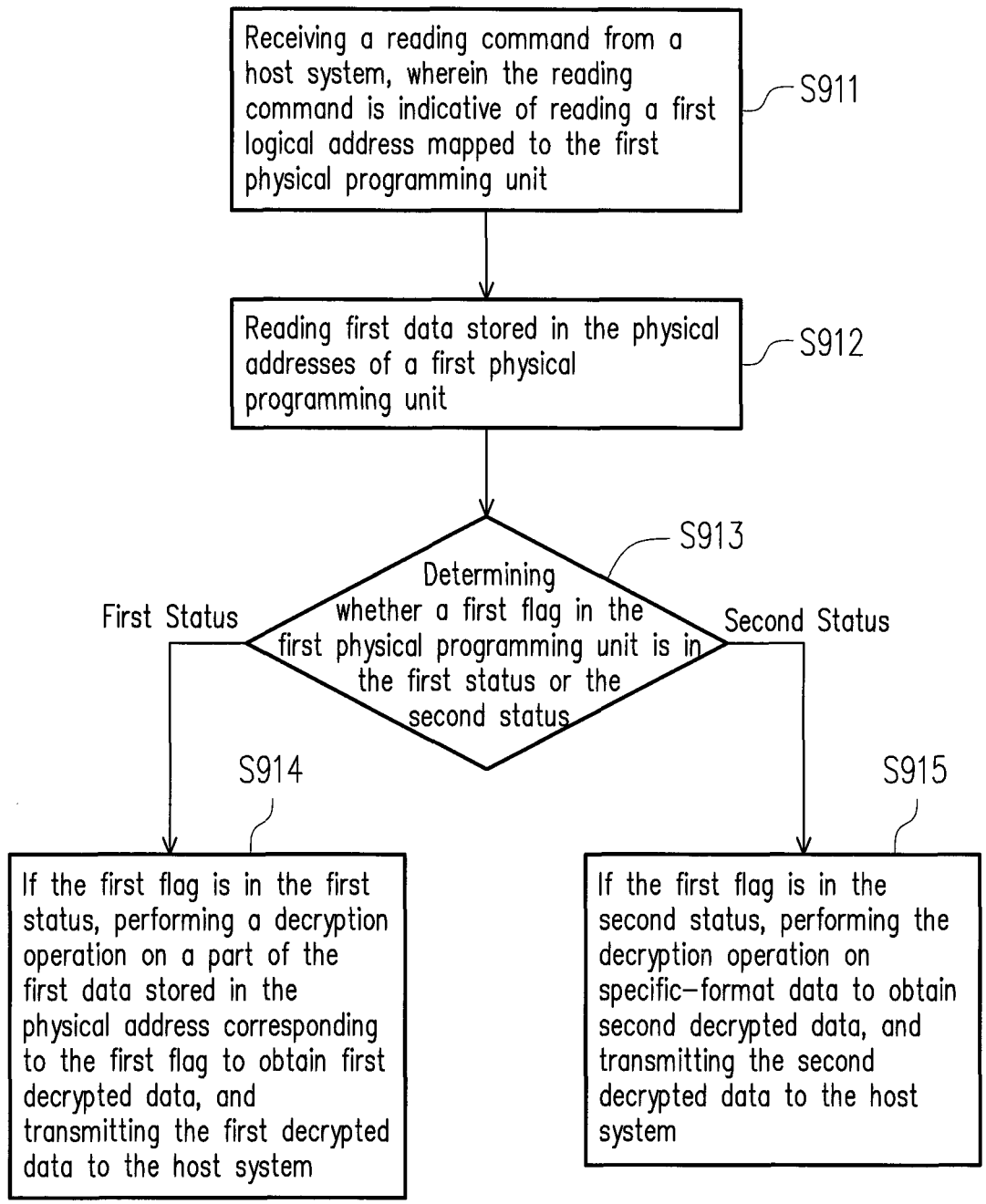

FIG. 9A and FIG. 9B are flowcharts of a data processing method according to an exemplary embodiment of the invention.

With reference to FIG. 9A, in step S902, an encryption operation is performed on second data. In step S903, a second physical programming unit is selected from plural physical programming units. In step S904, at least parts of the encrypted second data is written into at least one first physical address of the second physical programming unit, and the encrypted second data is not written into at least one second physical address of the second physical programming unit. In step S905, at least one second flag corresponding to the first physical address is set to be in a first status, and at least one third flag corresponding to the second physical address is set to be in a second status.

With reference to FIG. 9B, in step S911, a reading command is received from a host system. Here, the reading command is indicative of reading a first logical address which is mapped to the first physical programming unit. In step S912, first data stored in the physical addresses of a first physical programming unit is read. In step S913, whether a first flag in the first physical programming unit is in the first status or the second status is determined. If the first flag is in the first status, in step S914, a decryption operation is performed on a part of the first data stored in the physical address corresponding to the first flag to obtain first decrypted data, and the first decrypted data is transmitted to the host system. If the first flag is in the second status, in step S915, the decryption operation is performed on specific-format data to obtain second decrypted data, and the second decrypted data is transmitted to the host system. Here, the steps S912 to S915 are collectively referred to as the first reading process.

Each step shown in FIG. 9A and FIG. 9B is elaborated above and will no longer be described hereinafter. Note that the steps provided in FIG. 9A and FIG. 9B may be implemented in form of programming codes or circuits, which should not be construed as a limitation to the invention. In addition, the methods provided in FIG. 9A and FIG. 9B may be applied with reference to the previous embodiments or may be individually applied, and the invention is not limited thereto.

To sum up, according to the data processing method, the memory storage device, and the memory control circuit unit described in the exemplary embodiments of the invention, the encrypted specific-format data may be replaced by the flags, and therefore no additional circuit is required by the memory storage device for encrypting the specific-format data. Besides, after the first key is changed to the second key, the data encrypted by the first key or the data trimmed before the key updating command is received are transmitted to the host system in form of random numbers.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data processing method for a rewritable non-volatile memory module, wherein the rewritable non-volatile memory module comprises a plurality of physical programming units, each of the physical programming units comprises a data bit area comprising a plurality of physical addresses and a redundant bit area configured to record a plurality of flags, and each of the physical addresses corresponds to one of the plurality of flags, the data processing method comprising:
configuring, by a memory control circuit, a plurality of logical addresses and mapping the logical addresses to parts of the physical programming units;
receiving from a host system, by a memory control circuit, a reading command of reading a first logical address of the logical addresses, wherein the first logical address is mapped to a first physical programming unit of the physical programming units;
performing, by a memory control circuit, a first reading process, wherein the first reading process comprises:
reading first data stored in the physical addresses of the first physical programming unit;
determining whether a first flag of the flags corresponding to the physical addresses of the first physical programming unit is in a first status or in a second status;
if the first flag is in the first status, performing a decryption operation on a part of the first data stored in the physical address corresponding to the first flag according to a first key to obtain first decrypted data, and transmitting the first decrypted data to the host system; and
if the first flag is in the second status, performing the decryption operation on specific-format data according to the first key to obtain second decrypted data, and transmitting the second decrypted data to the host system.

2. The data processing method as recited in claim 1, wherein the first reading process further comprises:
determining whether the first logical address is an address specified by a trim command;
if the first logical address is the address specified by the trim command, transmitting the specific-format data to the host system.

3. The data processing method as recited in claim 1, further comprising:
receiving a key updating command from the host system;
changing the first key applied to an encryption operation and the decryption operation into a second key according to the key updating command.

4. The data processing method as recited in claim 3, further comprising:
if the reading command is received before the key updating command is received, performing the first reading process;
if the reading command is received after the key updating command is received, performing a second reading process, wherein the second reading process comprises:
reading the first data stored in the physical addresses of the first physical programming unit;
determining whether the first flag is in the first status or in the second status;
if the first data is encrypted by the first key, and the first flag is in the first status, performing the decryption operation on a part of the first data stored in the physical address corresponding to the first flag according to the second key to obtain third decrypted data, and transmitting the third decrypted data to the host system; and
if the first data is encrypted by the first key, and the first flag is in the second status, performing the decryption operation on the specific-format data according to the second key to obtain fourth decrypted data, and transmitting the fourth decrypted data to the host system.

5. The data processing method as recited in claim 4, wherein the second reading process further comprises:
determining whether the first data is encrypted by the first key or by the second key;
determining whether the first logical address is an address specified by a trim command;
if the first data is encrypted by the first key, and the first logical address is the address specified by the trim command, performing the decryption operation on the specific-format data according to the second key to obtain fifth decrypted data, and transmitting the fifth decrypted data to the host system.

6. The data processing method as recited in claim 4, wherein the second reading process further comprises:
determining whether the first data is encrypted by the first key or by the second key;
if the first data is encrypted by the second key, and the first flag is in the first status, performing the decryption operation on a part of the first data stored in the physical address corresponding to the first flag according to the second key to obtain fifth decrypted data, and transmitting the fifth decrypted data to the host system; and
if the first data is encrypted by the second key, and the first flag is in the second status, performing the decryption operation on the specific-format data according to the second key to obtain sixth decrypted data, and transmitting the sixth decrypted data to the host system.

7. The data processing method as recited in claim 4, wherein the second reading process further comprises:
determining whether the first data is encrypted by the first key or by the second key;
determining whether the first logical address is an address specified by a trim command; and
if the first data is encrypted by the second key, and the first logical address is the address specified by the trim command, transmitting the specific-format data to the host system.

8. The data processing method as recited in claim 1, the data processing method further comprising:
performing an encryption operation on second data;

selecting a second physical programming unit from the physical programming units;

writing at least part of the encrypted second data into at least one first physical address of the physical addresses of the second physical programming unit, wherein the encrypted second data is not written into at least one second physical address of the physical addresses of the second physical programming unit; and setting at least one second flag of the flags corresponding to the at least one first physical address to be in the first status and setting at least one third flag of the flags corresponding to the at least one second physical address to be in the second status.

9. A memory storage device comprising:

a connection interface unit configured to couple to a host system;

a rewritable non-volatile memory module comprising a plurality of physical programming units, wherein each of the physical programming units comprises a data bit area comprising a plurality of physical addresses and a redundant bit area configured to record a plurality of flags, and each of the physical addresses corresponds to one of the plurality of flags; and a memory control circuit unit coupled to the connection interface unit and the rewritable non-volatile memory module and configured to configure a plurality of logical addresses, map the logical addresses to parts of the physical programming units, and receive from a host system a reading command of reading a first logical address of the logical addresses, wherein the first logical address is mapped to a first physical programming unit of the physical programming units, wherein the memory control circuit unit is configured to perform a first reading process, and the first reading process comprises:

reading first data stored in the physical addresses of the first physical programming unit;

determining whether a first flag of the flags corresponding to the physical addresses of the first physical programming unit is in a first status or in a second status;

if the first flag is in the first status, performing a decryption operation on a part of the first data stored in the physical address corresponding to the first flag according to a first key to obtain first decrypted data, and transmitting the first decrypted data to the host system; and if the first flag is in the second status, performing the decryption operation on specific-format data according to the first key to obtain second decrypted data, and transmitting the second decrypted data to the host system.

10. The memory storage device as recited in claim 9, wherein the first reading process further comprises:

determining whether the first logical address is as address specified by a trim command;

if the first logical address is the address specified by the trim command, transmitting the specific-format data to the host system.

11. The memory storage device as recited in claim 9, wherein the memory control circuit unit is further configured to receive a key updating command from the host system and change the first key applied to an encryption operation and the decryption operation into a second key according to the key updating command.

12. The memory storage device as recited in claim 11, wherein if the reading command is received before the key updating command is received, the memory control circuit unit is configured to perform the first reading process, if the reading command is received after the key updating command is received, the memory control circuit unit is configured to perform a second reading process, and the second reading process comprises:

reading the first data stored in the physical addresses of the first physical programming unit;

determining whether the first data is encrypted by the first key or by the second key;

if the first data is encrypted by the first key, and the first flag is in the first status, performing the decryption operation on a part of the first data stored in the physical address corresponding to the first flag according to the second key to obtain third decrypted data, and transmitting the third decrypted data to the host system; and if the first data is encrypted by the first key, and the first flag is in the second status, performing the decryption operation on the specific-format data according to the second key to obtain fourth decrypted data, and transmitting the fourth decrypted data to the host system.

13. The memory storage device as recited in claim 12, wherein the second reading process further comprises:

determining whether the first data is encrypted by the first key or by the second key;

determining whether the first logical address is as address specified by a trim command;

if the first data is encrypted by the first key, and the first logical address is the address specified by the trim command, performing the decryption operation on the specific-format data according to the second key to obtain fifth decrypted data, and transmitting the fifth decrypted data to the host system.

14. The memory storage device as recited in claim 12, wherein the second reading process further comprises:

determining whether the first data is encrypted by the first key or by the second key;

if the first data is encrypted by the second key, and the first flag is in the first status, performing the decryption operation on a part of the first data stored in the physical address corresponding to the first flag according to the second key to obtain fifth decrypted data, and transmitting the fifth decrypted data to the host system; and if the first data is encrypted by the second key, and the first flag is in the second status, performing the decryption operation on the specific-format data according to the second key to obtain sixth decrypted data, and transmitting the sixth decrypted data to the host system.

15. The memory storage device as recited in claim 12, wherein the second reading process further comprises:

determining whether the first data is encrypted by the first key or by the second key;

determining whether the first logical address is an address specified by a trim command; and if the first data is encrypted by the second key, and the first logical address is the address specified by the trim command, transmitting the specific-format data to the host system.

16. The memory storage device as recited in claim 9, wherein the memory control circuit unit is further configured to perform an encryption operation on second data and select a second physical programming unit from the physical programming units, wherein the memory control circuit unit is configured to write at least parts of the encrypted second data into at least one first physical address of the physical addresses of the second physical programming unit, and the encrypted second data is not written into at least one second physical address of the physical addresses of the second physical programming unit, wherein the memory control circuit unit sets at least one second flag of the flags corresponding to the at least one first physical address to be in the first status and sets at least one third flag of the flags corresponding to the at least one second physical address to be in the second status.

17. A memory control circuit unit for controlling a rewritable non-volatile memory module, the memory control circuit unit comprising:

an encryption and decryption circuit;

a host interface configured to couple to a host system;

a memory interface configured to couple to the rewritable non-volatile memory module, wherein the rewritable non-volatile memory module comprises a plurality of physical programming units, each of the physical programming units comprises a data bit area comprising a plurality of physical addresses and a redundant bit area configured to record a plurality of flags, and each of the physical addresses corresponds to one of the plurality of flags; and a memory management circuit coupled to the host interface and the memory interface and configured to configure a plurality of logical addresses, map the logical addresses to parts of the physical programming units, and receive from the host system a reading command of reading a first logical address of the logical addresses, wherein the first logical address is mapped to a first physical programming unit of the physical programming units, wherein the memory management circuit is configured to read first data stored in the physical addresses of the first physical programming unit and determine whether a first flag of the flags corresponding to the physical addresses of the first physical programming unit is in a first status or in a second status, if the first flag is in the first status, the encryption and decryption circuit is configured to perform a decryption operation on a part of the first data stored in the physical address corresponding to the first flag according to a first key to obtain first decrypted data, and the memory management circuit is configured to transmit the first decrypted data to the host system, if the first flag is in the second status, the encryption and decryption circuit is configured to perform the decryption operation on specific-format data according to the first key to obtain second decrypted data, and the memory management circuit is configured to transmit the second decrypted data to the host system.

18. The memory control circuit unit as recited in claim 17, wherein the memory management circuit is further configured to determine whether the first logical address is as address specified by a trim command, and If the first logical address is the address specified by the trim command, the memory management circuit is configured to transmit the specific-format data to the host system.

19. The memory control circuit unit as recited in claim 17, wherein the memory management circuit is further configured to receive a key updating command from the host system, and the encryption and decryption circuit changes the first key applied to an encryption operation and the decryption operation into a second key according to the key updating command.

20. The memory control circuit unit as recited in claim 19, wherein if the reading command is received after the key updating command is received, the memory management circuit is configured to read the first data stored in the physical addresses of the first physical programming unit and determine whether the first flag is in the first status or in the second status, if the first data is encrypted by the first key, and the first flag is in the first status, the encryption and decryption circuit is configured to perform the decryption operation on a part of the first data stored in the physical address corresponding to the first flag according to the second key to obtain third decrypted data, and the memory management circuit is configured to transmit the third decrypted data to the host system, if the first data is encrypted by the first key, and the first flag is in the second status, the encryption and decryption is configured to perform the decryption operation on the specific-format data according to the second key to obtain fourth decrypted data, and the memory management circuit is configured to transmit the fourth decrypted data to the host system.

21. The memory control circuit unit as recited in claim 20, wherein the memory management circuit is further configured to determine whether the first data is encrypted by the first key or by the second key and determine whether the first logical address is an address specified by a trim command, if the first data is encrypted by the first key, and the first logical address is specified by the trim command, the encryption and decryption circuit is configured to perform the decryption operation on the specific-format data according to the second key to obtain fifth decrypted data, and the memory management circuit is configured to transmit the fifth decrypted data to the host system.

22. The memory control circuit unit as recited in claim 20, wherein the memory management circuit is further configured to determine whether the first data is encrypted by the first key or by the second key, if the first data is encrypted by the second key, and the first flag is in the first status, the encryption and decryption circuit is configured to perform the decryption operation on a part of the first data stored in the physical address corresponding to the first flag according to the second key to obtain fifth decrypted data, and the memory management circuit is configured to transmit the fifth decrypted data to the host system, if the first data is encrypted by the second key, and the first flag is in the second status, the encryption and decryption is configured to perform the decryption operation on the specific-format data according to the second key to obtain sixth decrypted data, and the memory management circuit is configured to transmit the sixth decrypted data to the host system.

23. The memory control circuit unit as recited in claim 20, wherein the memory management circuit is further configured to determine whether the first data is encrypted by the first key or by the second key and determine whether the first logical address is as address specified by a trim command, and if the first data is encrypted by the second key, and the first logical address is the address specified by the trim command, the memory management circuit is configured to transmit the specific-format data to the host system.

24. The memory control circuit unit as recited in claim 17,
wherein the memory management circuit is further configured to select a second physical programming unit from the physical programming units;
wherein the encryption and decryption circuit is configured to perform an encryption operation on second data, the memory management circuit is configured to write at least parts of the encrypted second data into at least one first physical address of the physical addresses of the second physical programming unit, and the encrypted second data is not written into at least one second physical address of the physical addresses of the second physical programming unit,
wherein the memory management unit sets at least one second flag of the flags corresponding to the at least one first physical address to be in the first status and sets at least one third flag of the flags corresponding to the at least one second physical address to be in the second status.

* * * * *